US006910630B2

(12) United States Patent
Schilling

(10) Patent No.: US 6,910,630 B2
(45) Date of Patent: Jun. 28, 2005

(54) PIRACY PREVENTION FOR VOICE AND VIDEO

(75) Inventor: Donald L. Schilling, Palm Beach Gardens, FL (US)

(73) Assignee: InstaView Systems, Inc., West Long Branch, NJ (US)

( * ) Notice: Subject to any disclaimer, the term of this patent is extended or adjusted under 35 U.S.C. 154(b) by 0 days.

(21) Appl. No.: 10/391,485

(22) Filed: Mar. 18, 2003

(65) Prior Publication Data

US 2004/0182920 A1 Sep. 23, 2004

(51) Int. Cl.[7] .................................................. G06K 7/08
(52) U.S. Cl. ..................... 235/451; 235/492; 705/51; 902/2
(58) Field of Search ................................. 235/451, 492; 902/2; 380/277; 705/51

(56) References Cited

U.S. PATENT DOCUMENTS 5,790,668 A * 8/1998 Tomko ....................... 713/186
5,889,860 A * 3/1999 Eller et al. .................. 705/51
6,363,357 B1 * 3/2002 Rosenberg et al. ........... 705/26
6,385,596 B1 * 5/2002 Wiser et al. ................. 705/51
6,502,195 B1 * 12/2002 Colvin ....................... 713/202

* cited by examiner

Primary Examiner—Michael G. Lee
Assistant Examiner—Seung H Lee
(74) Attorney, Agent, or Firm—David Newman Chrtd.

(57) ABSTRACT

Protecting content from piracy. A user computer stores a stored address. A smart card stores a smart-card address. The smart-card address matches the stored address. A seller stores content to be sold to the user. The content is encoded using the smart-card address from the smart card, as encoded content. A header is added to the encoded content, to generate header-encoded content. The header-encoded content is written on an encoded disk. The user computer detects the header from header-encoded content, as a detected header. The smart-card address is read from the smart card and verified with the stored address at the user computer. In response to a match and to the detected header, the encoded content embedded in the header-encoded content is decoded from the encoded disk.

14 Claims, 3 Drawing Sheets

PIRACY PREVENTION FOR VOICE AND VIDEO

BACKGROUND OF THE INVENTION

This invention relates to cable, DSL and other telephone mediums, and satellite distributed television and Internet signals, and more particularly to reducing piracy of voice and video of the distributed television and Internet signals.

DESCRIPTION OF THE RELEVANT ART

Today a common practice is to disregard the copyright on new movies and songs, and to improperly copy these items for resale. While pirates can be prosecuted when caught, this solution is not satisfactory.

SUMMARY OF THE INVENTION

A general object of the invention changes the paradigm by which music, movies or other content, are recorded and sold, to prevent copying of voice and video and data signals.

According to the present invention, as embodied and broadly described herein, an improvement for protecting content is provided. A user has a user computer. The improvement includes storing, at the user computer, a stored address. A smart card stores a smart-card address. The smart-card address matches the stored address of the user computer. The matching of the smart-card address with the stored address can be an identical match, or a less than identical match that passes a matching threshold when the smart-card address is correlated with the stored address. A seller has a storage medium, such as a compact disk or hard disk, for storing content to be sold to the user. The content is encoded using the smart-card address from the smart card, as generating encoded content. A header is added to the encoded content, to generate header-encoded content. The header-encoded content is written on an encoded disk.

At the user computer, the header is detected from header-encoded content on the encoded disk, thereby generating a detected header. The smart-card address is read from the smart card. The smart-card address read from the smart card is verified with the stored address at the user computer. In response to the smart-card address matching the stored address, a verification signal is generated. In response to the verification signal and in response to the detected header, using either the smart-card address or the stored address, the encoded content embedded in the header-encoded content is decoded from the encoded disk.

An alternative embodiment of the present invention includes storing, at a user computer, of an user, a stored address. A remote center, located remotely from the user computer, stores the content to b re sold to the user. The stored address is sent from the user computer to the remote center. At the remote center, using the stored address received from the user computer, the content is encoded, to generate encoded content. A header is added to the encoded content, to generate header-encoded content. The header-encoded content is sent to the user computer.

At the user computer, the header is detected from the header-encoded content, to generate a detected header. A smart-card address is read from the smart card. The smart-card address read from the smart card is verified with the stored address at the user computer. In response to the smart-card address matching the stored address, a verification signal is generated. In response to the verification signal and in response to the detected header, using either the smart-card address or the stored address, the encoded content is detected embedded in the header-encoded content from the remote center.

Additional objects and advantages of the invention are set forth in part in the description which follows, and in part are obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention, and together with the description serve to explain the principles of the invention.

DETAILED DESCRIPTION OF THE PREFERRED EMBODIMENTS

Figure 1:
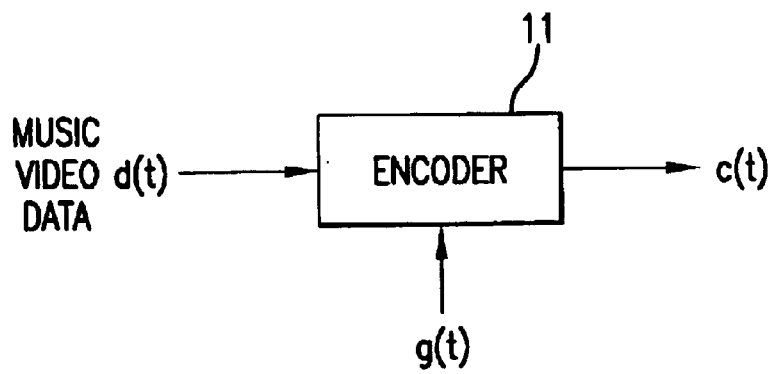
FIG. 1 show an encoder encoding music, video or data.

Reference now is made in detail to the present preferred embodiments of the invention, examples of which are illustrated in the accompanying drawings, wherein like reference numerals indicate like elements throughout the several views.

As illustratively shown in FIG. 1,

In the exemplary arrangement shown in FIG. 1

The present invention provides a novel way to protect content from piracy, for distributing from a store, content on, for example, a compact disk (CD), or from a remote center, over the Internet or cable. The present invention uses a stored address and a smart-card address, which are digital number $g(t)$, as shown in FIG. 1, to encode with an encoder 11 music, data, video to generate an encoded signal $c(t)$. The encoder 11 broadly represents encrypting, scrambling or other encoding for privacy and identification of a user-computer means. For example, the stored address or smart-card address may be a key used with an encryption or scrambling algorithm of the encoder 11. Alternatively, the stored address or smart-card address may be added directly to the input signal $d(t)$ and repeatedly added to the input signal until the entire input signal $d(t)$ is encoded. Also, the stored address or smart-card address may be added with and fraction or two or more bits, or fraction of bits, acting as chips, to spread the input signal $d(t)$.

From a store, the present invention broadly includes smart-card means, storage means, encoder means, header means, and disk-writing means. The storage means and the smart-card means are coupled to the encoder means. The header means and the encoder means are coupled to the disk-writing means. At a user, the present invention includes user-computer means, detector means, reader means, verifier means, and decoder means. The user-computer, either internally or externally, is coupled to detector means and decoder means. The verifier means is coupled to the reader means. The decoder means is coupled The user-computer means, of an user, stores a stored address. The smart-card means storing a smart-card address. The smart-card address is equal to the stored address of the user-computer means. The term STORED ADDRESS, as used herein, refers to a digital number associated with the user-computer means. The smart-card address and the stored address may be assigned with each new user-computer means. The storage means stores the content to be sold to the user. The encoder means encodes, using the smart-card address from the smart card, the content from any of the compact disk or the storage medium, thereby generating encoded content. The header means adds a header to the encoded content, thereby generating header-encoded content. The disk-writing means writes the header-encoded content, on an encoded disk.

At the user-computer means, the detector means detects the header from header-encoded content on the encoded disk, thereby generating a detected header. The reader means reads the smart-card address from the smart card. The verifier means verifies the smart-card address read from the smart card with the stored address at the user computer. In response to the smart-card address matching the stored address, the verifier means generates a verification signal. The decoder means, in response to the verification signal, and in response to the detected header, decodes, using either the smart-card address or the stored address, the encoded content embedded in the header-encoded content from the encoded disk.

Figure 2:
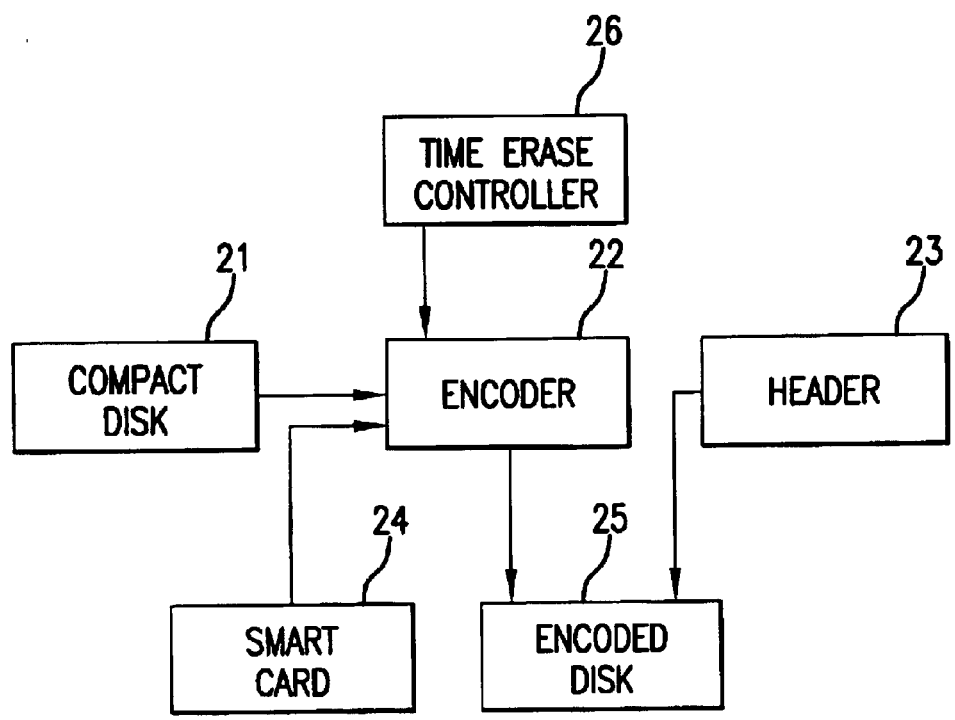
FIG. 2 is a block diagram for encoding content on an encoded disk.

In the exemplary arrangement, as shown in FIG. 2, the user-computer means is embodied as a user computer, the smart-card means is embodied as a smart-card reader 24, storage means is embodied as a compact disk 21 or equivalently other disk storage medium, the encoder means is embodied as an encoder 22, header means is embodied as a header subsystem 23, and the disk-writing means is embodied as an encoded disk 25. Time-erase means is embodied as a time-erase controller 26. The user computer, of an user, has a stored address. The smart-card means is embodied as smart-card reader 24 with smart card. The smart card, which is read by the smart-card reader 24, has a smart-card address. The encoder means is embodied as an encoder 22. The encoder 22 encodes, using the smart-card address from the smart card, the content from any of the compact disk or the storage medium. The output of the encoder 22 is referred to herein as encoded content. The header means is embodied as a header subsystem 23. The header subsystem 23 adds a header to the encoded content. The combination of the header added to the encoded content is referred to herein as header-encoded content. The time-erase controller 26 specifies a time period, and/or a number of times, which a program may be viewed. The time-erase control is then part of the packet 31 of FIG. 3. At the remote-user, a time-erase reader reads the time-erase control from packet 33, and then will erase or delete or otherwise impede the remote user from viewing the program after a specified time period and/or number of times viewed.

Figure 3:
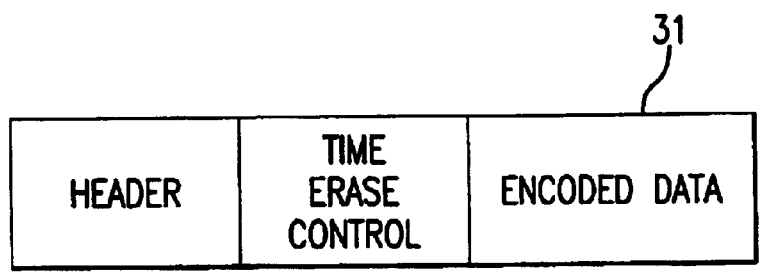
FIG. 3 illustrates a packet with a header and encoded content.

The header-encoded content 31 is shown in FIG. 3. The time period or number of times the program may be viewed is shown as time erase control. The disk-writing means generates the encoded disk 25. The disk-writing means may be a CD writer or other write device for delivering the header-encoded content to the user.

Figure 4:
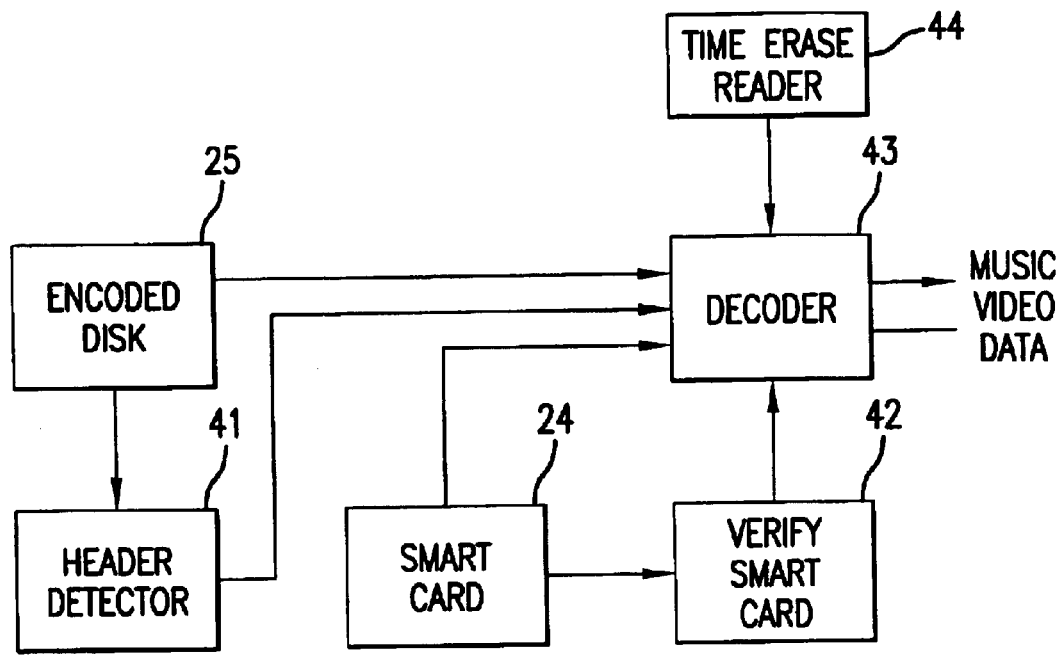
FIG. 4 is a block diagram for decoding content from an encoded disk.

At the user computer, as illustratively shown in FIG. 4, the detector means is embodied ad header detector 41. The reader means reads the encoded disk 25, and may be embodied ad a CD reader or other equivalent device for reading content or header-encoded content from the store.

The verifier means verifies the smart card 42, and would be embodied as a verifier subsystem. The decoder means is embodied as a decoder 43. The header detector 41 detects the header from header-encoded content on the encoded disk. The output from the header detector 41 is referred to herein as detected header. The user smart-card reader reads the smart-card address from the smart card 24. The verifier subsystem verifies the smart-card address read from the smart card 24 with the stored address at the user computer. In response to the smart-card address matching the stored address, the verifier subsystem generates a verification signal.

In response to the verification signal, and in response to the detected header, the decoder 43 decodes, using either the smart-card address or the stored address, the encoded content embedded in the header-encoded content from the encoded disk. The time-erase reader 44 reads the time-erase control from the packet of FIG. 3, and limits the remote user from viewing the program corresponding to the packet of FIG. 3, beyond a time period or number of times viewed.

Figure 5:
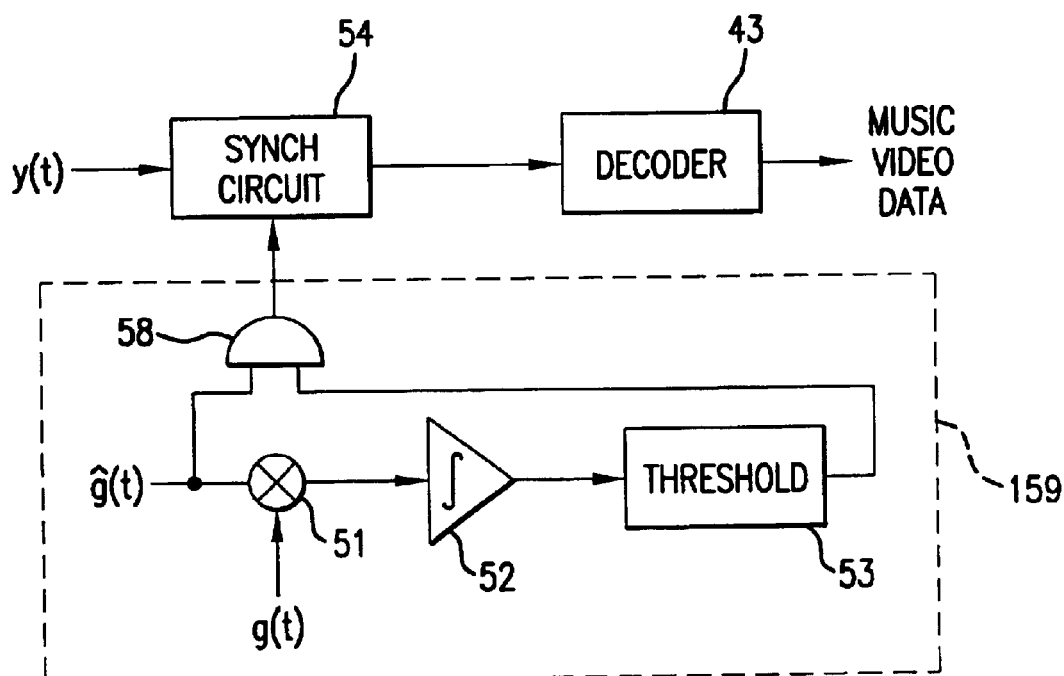
FIG. 5 is a block diagram of a verifier subsystem.

A representative verifier subsystem is shown in FIG. 5. The verifier subsystem may include correlation means embodied a correlator 159, including a product device 51, an integrator 52, a threshold device 53, an AND gate 58, and a synchronization (SYNCH) circuit 54 coupled to the decoder 43. The product device 51 multiplies the stored address g'(t) by smart-card address g(t). The integrator 52 integrates, or in combination with the product device, convolutes, the stored address with the smart-card address. The threshold device 53 compares, to a threshold, the convolved stored address with the smart-card address. The threshold need not be an absolute perfect match, but within, by way of example, of a maximum value. If the convolved value exceeds the threshold, then the threshold device generates an ENABLE signal, which permits the smart-card address, or equivalently the stored address, to go to the SYNCH circuit 54. The decoder 43 accordingly decodes the encoded content. The correlator 159 equivalently may be a matched filter, performing the same function, as is well-known in the art.

An alternative embodiment of the present invention includes, at a user, user-computer means, detector means, reader means, verifier means, and decoder means. At a remote center, remotely located from the user-computer means, the alternative embodiment of the present invention includes user-transmitter means, encoder means, header means, and remote-transmitter means. The remote center stores the content to be sold to the user. The user-transmitter means sends the stored address from the user computer to the remote center. The encoder means encodes, using the stored address received from the user computer, the content from any of the compact disk or the storage medium, thereby generating encoded content. The header means adds a header to the encoded content, thereby generating header-encoded content. The remote-transmitter means sends the header-encoded content to the user computer.

At the user-computer means, the detector means detects the header from the header-encoded content, thereby generating a detected header. The reader means reads a smart-card address from the smart card. The verifier means verifies the smart-card address read from the smart card with the stored address at the user computer. In response to the smart-card address matching the stored address, the verifier means generates a verification signal. In response to the verification signal, and in response to the detected header, the decoder means decodes, using either the smart-card address or the stored address, the encoded content embedded in the header-encoded content from the remote center.

Figure 6:
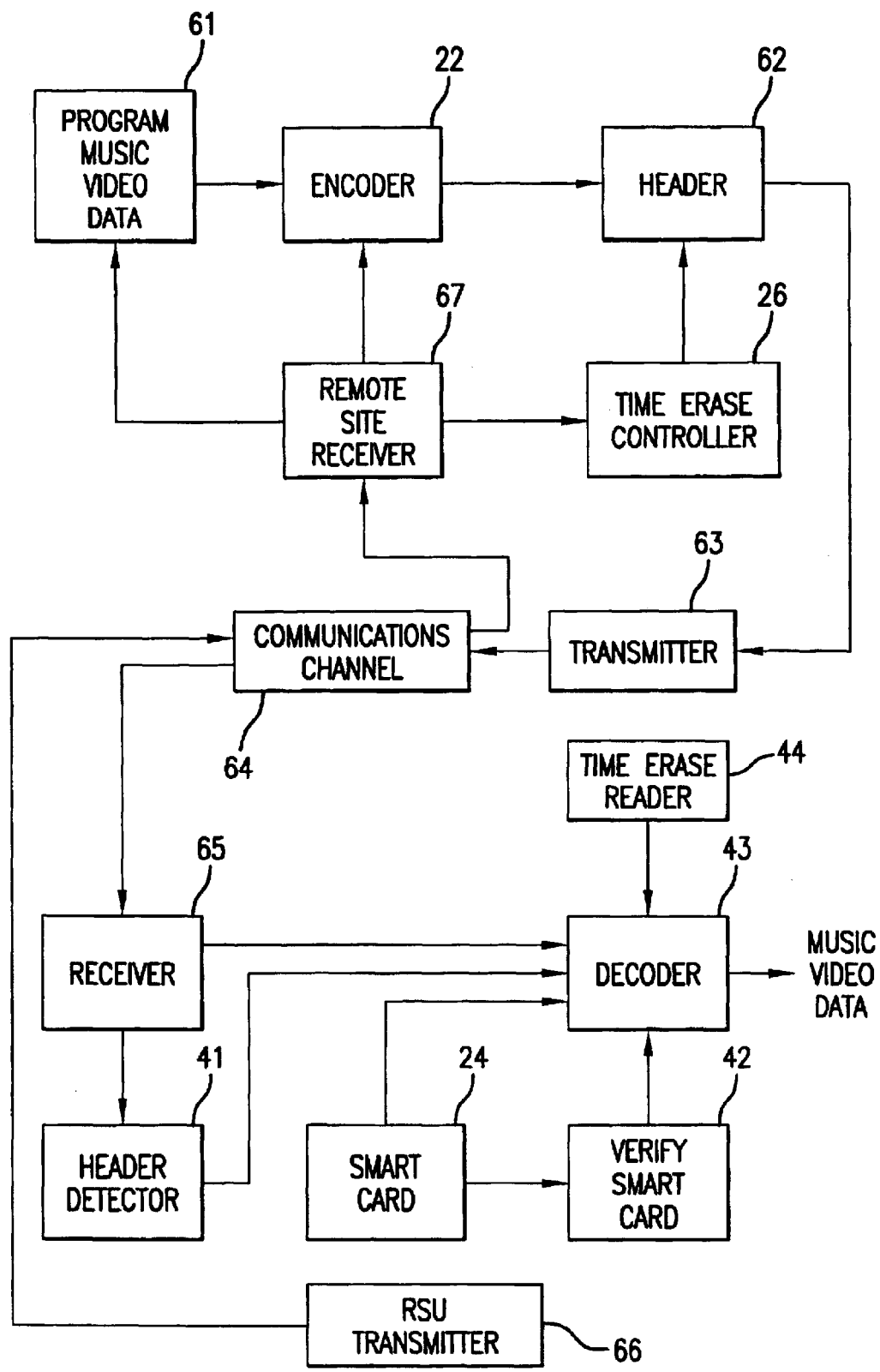
FIG. 6 is a block diagram of encoding at a remote center and decoding at a user computer.

As illustratively shown in FIG. 6, at the remote center, the user-transmitter means is embodied as a transmitter 63, the encoder means is embodied as encoder 22, the header means is embodied as header subsystem 62, and the remote-transmitter means is embodied as remote transmitter 63. The user-computer means is embodied as a user computer, the detector means is embodied a header detector 41, the reader means is embodied as smart-card reader for reading the smart card 24. The verifier means is embodied as verifier subsystem 42, and the decoder means is embodied as decoder 43.

At a remote user, a remote-subscriber-unit (RSU) transmitter 66 sends a request to the remote center for a particular program or content. At the remote center, a remote center receiver 67 receives the request, and activates retrieving the requested program or content from program, music, video, data 61, and encodes the content with encoder 22. A time-erase reader 44 reads the time-erase control information from the packet requesting the program, and then sets limits on period of time, or number of times, or other limitation, during which the requested program may be viewed by the requesting user.

The user computer stores a stored address. The remote center has any of a compact disk or a storage medium, located remotely from the user computer. The remote center has the content to be sold to the user. The user-transmitter means sends the stored address from the user computer to the remote center. The encoder 22 encodes, using the stored address received from the user computer, the content from any of the compact disk or the storage medium, thereby generating encoded content. The header subsystem 62 adds a header to the encoded content, thereby generating header-encoded content. The remote-transmitter 63 sends the header-encoded content to the user computer over a communications channel 64.

The header detector 41 detects the header from the header-encoded content, thereby generating a detected header. The user smart-card reader reads a smart-card address from the smart card 24. The verifier subsystem 42 verifies the smart-card address read from the smart card with the stored address at the user computer. In response to the smart-card address matching the stored address, the verifier subsystem 42 generates a verification signal.

In response to the verification signal and responsive to the detected header, the decoder 43 decodes, using either the smart-card address or the stored address, the encoded content embedded in the header-encoded content from the remote center. The time-erase reader 44 reads the time-erase control and then limits the period of time and/or number of times, or other limitation, during a program may be viewed.

The present invention comprises the improvement, with the steps of storing, at a user computer, of an user, having a stored address; storing in a smart card, a smart-card address, with the smart-card address equal to the stored address of the user computer; storing content to be sold to the user; encoding, using the smart-card address from the smart card, the content, thereby generating encoded content; adding a header to the encoded content, thereby generating header-encoded content; writing the header-encoded content, on an encoded disk; detecting, at the user computer, the header from header-encoded content on the encoded disk, thereby generating a detected header; reading, at the user computer, the smart-card address from the smart card; verifying, at the user computer, the smart-card address read from the smart card with the stored address at the user computer; generating, in response to the smart-card address matching the stored address, a verification signal; and decoding, in response to the verification signal and in response to the detected header, using either the smart-card address or the stored address, the encoded content embedded in the header-encoded content from the encoded disk.

Alternatively, the present invention includes the steps of storing, at a user computer, of an user, a stored address; storing, at a remote center, located remotely from the user computer, the content to be sold to the user; sending the stored address from the user computer to the remote center; encoding, located at the remote center, using the stored address received from the user computer, the content from any of the compact disk or the storage medium, thereby generating encoded content; adding, located at the remote center, a header to the encoded content, thereby generating header-encoded content; sending the header-encoded content to the user computer; detecting, located at the user computer, the header from the header-encoded content, thereby generating a detected header; reading, at the user computer, a smart-card address from the smart card; verifying, at the user computer, the smart-card address read from the smart card with the stored address at the user computer; generating, in response to the smart-card address matching the stored address, a verification signal; and decoding, in response to the verification signal and responsive to the detected header, using either the smart-card address or the stored address, the encoded content embedded in the header-encoded content from the remote center.

It will be apparent to those skilled in the art that various modifications can be made to the piracy prevention of voice and video method and apparatus of the instant invention without departing from the scope or spirit of the invention, and it is intended that the present invention cover modifications and variations of the piracy prevention of voice and video method and apparatus provided they come within the scope of the appended claims and their equivalents.

I claim:

1. An improvement for protecting content, comprising:
   a user computer, of an user, having a stored address;
   a smart card having a smart-card address, with the smart-card address equal to the stored address of the user computer;
   any of a compact disk or a storage medium, having the content to be sold to the user;
   an encoder, remotely located from the user computer, for encoding, using the smart-card address from the smart card, the content from any of the compact disk or the storage medium, thereby generating encoded content;
   a header subsystem for adding a header to the encoded content, thereby generating header-encoded content;
   disk-writing means for writing the header-encoded content, on an encoded disk;
   a header detector, located at the user computer, for detecting the header from header-encoded content on the encoded disk, thereby generating a detected header;
   a user smart-card reader, located at the user computer, for reading the smart-card address from the smart card;
   a verifier subsystem, located at the user computer, for verifying the smart-card address read from the smart card with the stored address at the user computer, and responsive to the smart-card address matching the stored address, for generating a verification signal; and
   a decoder, responsive to the verification signal and responsive to the detected header, for decoding, using either the smart-card address or the stored address, the encoded content embedded in the header-encoded content from the encoded disk.

2. An improvement for protecting content, comprising:

a user computer, of an user, having a stored address;

a remote center, having any of a compact disk or a storage medium, located remotely from the user computer, having the content to be sold to the user;

user-transmitter means for sending the stored address from the user computer to the remote center;

an encoder, located at the remote center, for encoding, using the stored address received from the user computer, the content from any of the compact disk or the storage medium, thereby generating encoded content;

a header subsystem, located at the remote center, for adding a header to the encoded content, thereby generating header-encoded content;

remote-transmitter means for sending the header-encoded content to the user computer;

a header detector, located at the user computer, for detecting the header from the header-encoded content, thereby generating a detected header;

a user smart-card reader, located at the user computer, for reading a smart-card address from the smart card;

a verifier subsystem, located at the user computer, for verifying the smart-card address read from the smart card with the stored address at the user computer, and a user smart-card reader, located at the user computer, for reading the smart-card address from the smart card;

a verifier subsystem, located at the user computer, for verifying the smart-card address read from the smart card with the stored address at the user computer, and responsive to the smart-card address matching; and a decoder, responsive to the verification signal and responsive to the detected header, for decoding, using either the smart-card address or the stored address, the encoded content embedded in the header-encoded content from the remote center.

3. An improvement for protecting content, comprising:

a user computer, of an user, having a stored address;

a smart card having a smart-card address, with the smart-card address equal to the stored address of the user computer;

any of a compact disk or a storage medium, having the content to be sold to the user;

an encoder for encoding, using the smart-card address from the smart card, the content from any of the compact disk or the storage medium, thereby generating encoded content;

a header subsystem for adding a header to the encoded content, thereby generating header-encoded content; and disk-writing means for writing the header-encoded content, on an encoded disk.

4. An improvement for protecting content, comprising:

a header detector, located at a user computer, for detecting a header from header-encoded content on an encoded disk, thereby generating a detected header;

a user smart-card reader, located at the user computer, for reading a smart-card address from a smart card;

a verifier subsystem, located at the user computer, for verifying the smart-card address read from the smart card with a stored address at the user computer, and responsive to the smart-card address matching the stored address, for generating a verification signal; and a decoder, responsive to the verification signal and responsive to the detected header, for decoding, using either the smart-card address or the stored address, the encoded content embedded in the header-encoded content from the encoded disk.

5. An improvement for protecting content, comprising:

user computer means, of an user, for storing a stored address;

smart-card means for storing a smart-card address, with the smart-card address equal to the stored address of the user computer;

storage means for storing the content to be sold to the user;

encoder means, remotely located from the user computer, for encoding, using the smart-card address from the smart card, the content from any of the compact disk or the storage medium, thereby generating encoded content;

header means for adding a header to the encoded content, thereby generating header-encoded content;

disk-writing means for writing the header-encoded content, on an encoded disk;

detector means, located at the user computer, for detecting the header from header-encoded content on the encoded disk, thereby generating a detected header;

reader means, located at the user computer, for reading the smart-card address from the smart card;

verifier means, located at the user computer, for verifying the smart-card address read from the smart card with the stored address at the user computer, and responsive to the smart-card address matching the stored address, for generating a verification signal; and decoder means, responsive to the verification signal and responsive to the detected header, for decoding, using either the smart-card address or the stored address, the encoded content embedded in the header-encoded content from the encoded disk.

6. An improvement for protecting content, comprising:

user-computer means, of an user, for storing a stored address;

remote center, located remotely from the user computer, for storing the content to be sold to the user;

user-transmitter means for sending the stored address from the user computer to the remote center;

encoder means, located at the remote center, for encoding, using the stored address received from the user computer, the content from any of the compact disk or the storage medium, thereby generating encoded content;

header means, located at the remote center, for adding a header to the encoded content, thereby generating header-encoded content;

remote-transmitter means for sending the header-encoded content to the user computer;

detector means, located at the user computer, for detecting the header from the header-encoded content, thereby generating a detected header;

reader means, located at the user computer, for reading a smart-card address from the smart card;

verifier means, located at the user computer, for verifying the smart-card address read from the smart card with the stored address at the user computer, and responsive to the smart-card address matching the stored address, for generating a verification signal; and decoder means, responsive to the verification signal and responsive to the detected header, for decoding, using either the smart-card address or the stored address, the encoded content embedded in the header-encoded content from the remote center.

7. An improvement for protecting content, comprising:

user-computer, of an user, for storing a stored address;

smart-card means for storing a smart-card address, with the smart-card address equal to the stored address of the user computer;

storage means for storing the content to be sold to the user;

encoder means for encoding, using the smart-card address from the smart card, the content from any of the compact disk or the storage medium, thereby generating encoded content;

header means for adding a header to the encoded content, thereby generating header-encoded content; and disk-writing means for writing the header-encoded content, on an encoded disk.

8. An improvement for protecting content, comprising:

detector means, located at a user computer, for detecting a header from header-encoded content on an encoded disk, thereby generating a detected header;

reader means, located at the user computer, for reading a smart-card address from a smart card;

verifier means, located at the user computer, for verifying the smart-card address read from the smart card with a stored address at the user computer, and responsive to the smart-card address matching the stored address, for generating a verification signal; and decoder means, responsive to the verification signal and responsive to the detected header, for decoding, using either the smart-card address or the stored address, the encoded content embedded in the header-encoded content from the encoded disk.

9. An improvement for protecting content, comprising the steps of:

storing, at a user computer, of an user, having a stored address;

storing in a smart card, a smart-card address, with the smart-card address equal to the stored address of the user computer;

storing content to be sold to the user;

encoding, remotely located from the user computer, using the smart-card address from the smart card, the content, thereby generating encoded content;

adding a header to the encoded content, thereby generating header-encoded content;

writing the header-encoded content, on an encoded disk;

detecting, at the user computer, the header from header-encoded content on the encoded disk, thereby generating a detected header;

reading, at the user computer, the smart-card address from the smart card;

verifying, at the user computer, the smart-card address read from the smart card with the stored address at the user computer;

generating, in response to the smart-card address matching the stored address, a verification signal; and decoding, in response to the verification signal and in response to the detected header, using either the smart-card address or the stored address, the encoded content embedded in the header-encoded content from the encoded disk.

10. An improvement for protecting content, comprising the steps of:

storing, at a user computer, of an user, a stored address;

storing, at a remote center, located remotely from the user computer, the content to be sold to the user;

sending the stored address from the user computer to the remote center;

encoding, located at the remote center, using the stored address received from the user computer, the content from any of the compact disk or the storage medium, thereby generating encoded content;

adding, located at the remote center, a header to the encoded content, thereby generating header-encoded content;

sending the header-encoded content to the user computer;

detecting, located at the user computer, the header from the header-encoded content, thereby generating a detected header;

reading, at the user computer, a smart-card address from the smart card;

verifying, at the user computer, the smart-card address read from the smart card with the stored address at the user computer;

generating, in response to the smart-card address matching the stored address, a verification signal; and decoding, in response to the verification signal and responsive to the detected header, using either the smart-card address or the stored address, the encoded content embedded in the header-encoded content from the remote center.

11. An improvement for protecting content, comprising the steps of:

storing, at a user computer, of an user, having a stored address;

storing in a smart card, a smart-card address, with the smart-card address equal to the stored address of the user computer;

storing content to be sold to the user;

encoding, using the smart-card address from the smart card, the content, thereby generating encoded content;

adding a header to the encoded content, thereby generating header-encoded content; and writing the header-encoded content, on an encoded disk.

12. An improvement for protecting content, comprising the steps of:

detecting, at a user computer, a header from header-encoded content on an encoded disk, thereby generating a detected header;

reading, at the user computer, a smart-card address from a smart card;

verifying, at the user computer, the smart-card address read from the smart card with a stored address at the user computer;

generating, in response to the smart-card address matching the stored address, a verification signal; and decoding, in response to the verification signal and in response to the detected header, using either the smart-card address or the stored address, the encoded content embedded in the header-encoded content from the encoded disk.

13. The improvement as set forth in claim 1, 2, 3, 4, 5, or 6, further including:
  a time-erase controller for specifying a time period, and/or a number of times, which a program may be viewed; and
  a time-erase reader for reading the time-erase control, and for erasing or deleting or otherwise impeding the remote user from viewing the program after a specified time period and/or number of times viewed.

14. The improvement as set forth in claim 7, 8, 9, 10, 11 or 12, further including the steps of:
  specifying a time period, and/or a number of times, which a program may be viewed; and
  erasing or deleting or otherwise impeding the remote user from viewing the program after a specified time period and/or number of times viewed.

* * * * *